US006606350B2

(12) United States Patent
Dress, Jr. et al.

(10) Patent No.: US 6,606,350 B2
(45) Date of Patent: Aug. 12, 2003

(54) PULSE TRANSMISSION RECEIVER WITH HIGHER-ORDER TIME DERIVATIVE PULSE GENERATOR

(75) Inventors: William B. Dress, Jr., Knoxville, TN (US); Stephen F. Smith, Loudon, TN (US)

(73) Assignee: Lockheed Martin Energy Research Corporation, Oak Ridge, TN (US)

( * ) Notice: Subject to any disclaimer, the term of this patent is extended or adjusted under 35 U.S.C. 154(b) by 0 days.

(21) Appl. No.: 10/082,568

(22) Filed: Feb. 25, 2002

(65) Prior Publication Data

US 2002/0097790 A1 Jul. 25, 2002

Related U.S. Application Data

(62) Division of application No. 09/404,009, filed on Sep. 23, 1999.

(51) Int. Cl.$^7$ ................................................ H04B 17/02
(52) U.S. Cl. ................................................... 375/213
(58) Field of Search .............................. 375/239, 244, 375/256, 259, 342, 326, 344, 354, 213, 146; 714/704, 707, 709

(56) References Cited

U.S. PATENT DOCUMENTS

| | | | |
|---|---|---|---|
| 4,596,023 A | 6/1986 | Driver et al. ................. 375/55 |
| 4,641,317 A | 2/1987 | Fullerton ........................ 375/1 |
| 4,743,906 A | 5/1988 | Fullerton ........................ 375/1 |
| 4,813,057 A | 3/1989 | Fullerton ...................... 375/37 |
| 4,843,354 A | 6/1989 | Fuller et al. .................. 333/81 |
| 4,908,811 A | * 3/1990 | Yokogawa et al. ....... 369/53.36 |
| 4,979,186 A | 12/1990 | Fullerton ........................ 375/23 |
| 5,128,619 A | 7/1992 | Bjork et al. |
| 5,150,377 A | * 9/1992 | Vannucci ..................... 375/146 |
| 5,274,271 A | 12/1993 | McEwan ...................... 307/108 |

(List continued on next page.)

FOREIGN PATENT DOCUMENTS

| | | |
|---|---|---|
| EP | 0851603 | 7/1998 |
| FR | 2706104 | 12/1994 |
| WO | WO 9834339 | 8/1998 |

OTHER PUBLICATIONS

"Applications of a Fast, Continuous Wavelet Transform", William B. Dress, The Society of Photo–Optical Instrumentation Engineers, vol. 3078, p. 570–580.
"Impulse Radio Overview", Paul Withington of Time Domain Corporation.
Elmirghani et al., "Slot and frame synchronisation in optical fiber PPM systems with dispersed pulse shapes," *Jour. Optic. Comm.*, 15:5–10, 1994.

Primary Examiner—Chi Pham
Assistant Examiner—Emmanuel Bayard
(74) Attorney, Agent, or Firm—Gray Cary Ware & Friedenrich, LLP

(57) ABSTRACT

Systems and methods for pulse-transmission low-power communication modes are disclosed. A pulse transmission receiver includes: a front-end amplification/processing circuit; a synchronization circuit coupled to the front-end amplification/processing circuit; a clock coupled to the synchronization circuit; a trigger signal generator coupled to the clock; and at least one higher-order time derivative pulse generator coupled to the trigger signal generator. The systems and methods significantly reduce lower-frequency emissions from pulse transmission spread-spectrum communication modes, which reduces potentially harmful interference to existing radio frequency services and users and also simultaneously permit transmission of multiple data bits by utilizing specific pulse shapes.

19 Claims, 9 Drawing Sheets

U.S. PATENT DOCUMENTS

| | | | |
|---|---|---|---|
| 5,345,471 A | 9/1994 | McEwan | 375/1 |
| 5,363,108 A | 11/1994 | Fullerton | 342/27 |
| 5,510,800 A | 4/1996 | McEwan | 342/387 |
| 5,519,400 A | 5/1996 | McEwan | 342/28 |
| 5,523,760 A | 6/1996 | McEwan | 342/89 |
| 5,589,838 A | 12/1996 | McEwan | 342/387 |
| 5,592,073 A | 1/1997 | Redlich | |
| 5,631,070 A | 5/1997 | Nishii et al. | 428/220 |
| 5,661,490 A | 8/1997 | McEwan | 342/387 |
| 5,677,927 A | 10/1997 | Fullerton et al. | 375/200 |
| 5,687,169 A | 11/1997 | Fullerton | 370/324 |
| 5,732,113 A | 3/1998 | Schmidl et al. | |
| 5,764,696 A | 6/1998 | Barnes et al. | 375/239 |
| 5,812,081 A | 9/1998 | Fullerton | |
| 5,832,035 A | 11/1998 | Fullerton | 375/210 |
| 5,832,772 A | 11/1998 | McEwan | 73/290 R |
| 5,834,986 A | 11/1998 | Myers | |
| 5,841,666 A * | 11/1998 | Perdue et al. | 702/189 |
| 5,933,453 A | 8/1999 | Lewison | |
| 5,956,318 A | 9/1999 | Saeki | |
| 5,959,447 A | 9/1999 | Bridges et al. | |
| 5,966,090 A | 10/1999 | McEwan | 342/27 |
| 5,978,412 A | 11/1999 | Takai | |
| 5,982,874 A | 11/1999 | Braams | |
| 5,991,346 A * | 11/1999 | Lu | 375/355 |
| 5,995,046 A | 11/1999 | Belcher et al. | |
| 6,021,110 A | 2/2000 | McGibney | |
| 6,085,067 A | 7/2000 | Gallagher et al. | |
| 6,128,332 A | 10/2000 | Fukawa et al. | |
| 6,130,643 A | 10/2000 | Trippett et al. | |
| 6,167,299 A * | 12/2000 | Galchenkov et al. | 600/547 |
| 6,195,614 B1 | 2/2001 | Kochan | |
| 6,259,723 B1 | 7/2001 | Miyashita | |
| 6,292,517 B1 * | 9/2001 | Jeffress et al. | 375/287 |
| 6,314,055 B1 | 11/2001 | Foxlin et al. | |
| 6,400,754 B2 | 6/2002 | Fleming et al. | |
| 6,430,208 B1 | 8/2002 | Fullerton et al. | |
| 6,452,959 B1 | 9/2002 | McDonough | |

\* cited by examiner

PULSE TRANSMISSION RECEIVER WITH HIGHER-ORDER TIME DERIVATIVE PULSE GENERATOR

This application is a divisional of, and claims a benefit of priority under 35 U.S.C. 120 from, co-pending application Ser. No. 09/404,009 filed Sep. 23, 1999.

STATEMENT AS TO RIGHTS TO INVENTIONS MADE UNDER FEDERALLY-SPONSORED RESEARCH AND DEVELOPMENT

This invention was made with Government support under contract No. DE-AC05-96OR22464 awarded by the United States Department of Energy to Lockheed Martin Energy Research Corporation, and the Government has certain rights in this invention.

BACKGROUND OF THE INVENTION

1. Field of the Invention

The invention relates generally to the field of pulse transmission communications. More particularly, the invention relates to pulse transmission, spread-spectrum modes of low-power radio communications.

2. Discussion of the Related Art

Prior art time-domain communications techniques are known to those skilled in the art. The bandwidth and center frequency of a conventional time-domain transmission are both explicit functions of the pulse width.

In these techniques, the controllable parameters are the pulse width and power. These techniques normally allow only 1 bit to be conveyed per transmitted pulse, thereby limiting their communications usefulness.

A problem with this existing technology has been that the parameters of pulse width and power effectively provide only two degrees of freedom. This constraint severely limits the flexibility of the prior-art time-domain techniques. Therefore, what is required is an approach to time-domain communications that provides more degrees of freedom.

Another problem with this existing technology has been that only one bit can be encoded per transmitted pulse. This constraint severely limits the data bandwidth of the prior art time-domain techniques. Therefore, what is also required is an approach to time-domain communications that permits more than one bit per pulse to be communicated.

Heretofore, the requirements of providing additional degrees of freedom and communicating multiple bits per pulse have not been fully met. What is needed is an approach that can address both of these requirements. The invention is directed to meeting these requirements, among others.

SUMMARY OF THE INVENTION

The main object of the invention is to provide a versatile, multi-bit, very broadband, high bit-rate data communications method. Another goal of the invention is to use higher-order derivatives of pulsed (time-domain) signals to satisfy the above-discussed requirements of providing additional degrees of freedom and communicating multiple bits per pulse which, in the case of the prior art, are not simultaneously satisfied.

One embodiment of the invention is based on a method of pulse-transmission communications, comprising: generating a modulated pulse-signal waveform; transforming said modulated pulse-signal waveform into at least one higher-order derivative waveform; and transmitting said at least one higher-order derivative waveform as an emitted pulse. Information is preferentially encoded as the derivative order and phase; alternatively, time derivatives between pulses can also encode information. In the latter case, the higher-order derivative pulse provides flexible control over bandwidth and band center-frequency, thus alleviating noise and other interference problems. Another embodiment of the invention is based on an electromagnetic waveform, comprising: an emitted pulse that is produced from at least one higher-order derivative waveform of a modulated pulse-signal waveform. Another embodiment of the invention is based on an apparatus based on an array of various higher-order derivative-pulse generators, each of which is modulated by an information signal. The modulated derivative pulses are summed, amplified, and coupled to a transmission medium (antenna, cable, optical fiber, etc.) The complementary receiver recovers the modulated pulses via standard correlation.

These, and other, goals and embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference characters designate the same parts. It should be noted that the features illustrated in the drawings are not necessarily drawn to scale.

DESCRIPTION OF PREFERRED EMBODIMENTS

Figure 1:
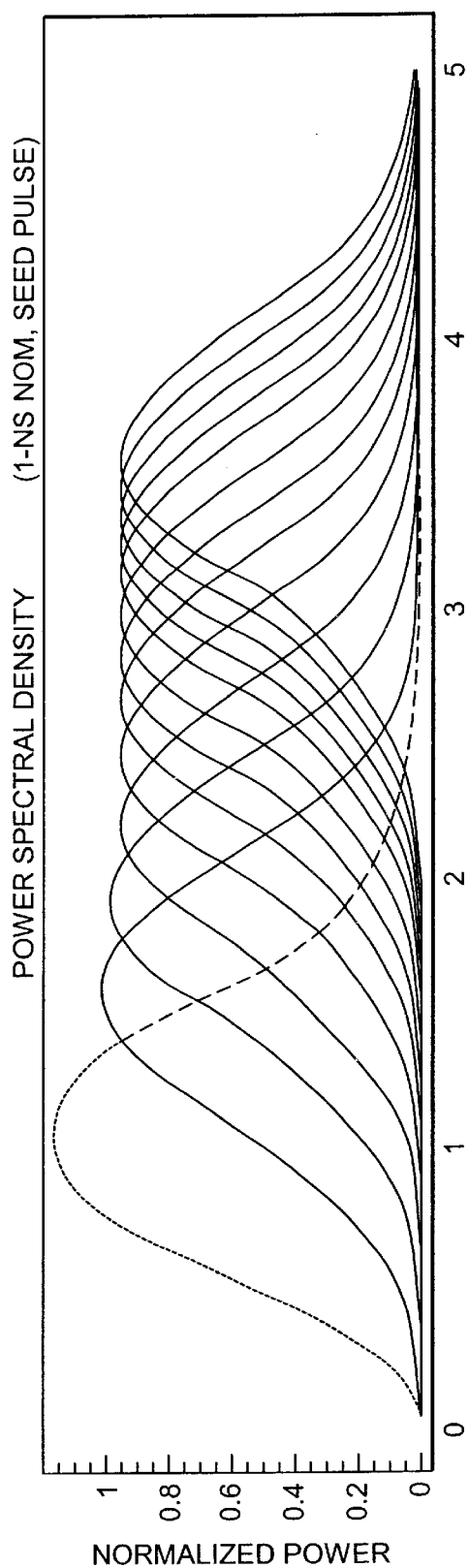
FIG. 1 illustrates a series of Gaussian derivative wavelets in frequency space, representing an embodiment of the invention.

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

The context of the invention is spread-spectrum communications. For instance, the invention can be used in the context of low-power spread-spectrum radio communications. The invention can also utilize data processing methods that transform the received pulse transmission signals so as to actuate interconnected discrete hardware elements; for example, to remotely reconfigure repeater(s) and/or router(s).

The invention includes using higher-order derivatives of waveforms to implement pulse transmission communications, whereby the shape as well as the bandwidth and center frequency of the transmitted power pulse may be used as adjustable parameters allowing a more versatile transmission architecture. In addition, the higher-derivative pulses may be used as the basis of a multiple-bit symbol system, greatly increasing the transmitted information rate.

The phrase "higher-order derivative," as used herein, is defined as at least a second order derivative (i.e., 2nd order, 3rd order, . . . nth order). The term "approximately", as used herein, is defined as at least close to a given value (e.g., preferably within 10% of, more preferably within 1% of, and most preferably within 0.1% of). The term "coupled", as used herein, is defined as connected, although not necessarily directly, and not necessarily mechanically. The term "programmable", as used herein, is as defined controllable by two or more lines of code that can be executed by a computer.

The term "orthogonal," as used herein, is defined as two or more functions or signals whose overlap is zero. The practical advantage of using orthogonal signals is that they do not interfere with each other and they are independent, which means that information carried by one can be inserted or extracted independently of the information in the other. For instance, a sine and a cosine signal each of the same frequency are orthogonal; quadrature signals are orthogonal.

The invention provides another degree of freedom (shape) to control the transmission's spectral properties, thereby allowing a wider range of applications, greater receiver selectivity, and the ability to avoid known interferers and reduce potentially harmful interference to existing radio frequency (RF) services and users. The invention allows reduced emissions in lower-frequency regions compared to those of the prior art. This will reduce interference to existing radio frequency services and users. The invention can (for a given spectral content) permit longer generating pulse widths and easier electronic implementation, ensuring compatibility with existing commercial devices and processes.

The invention can include the capability of implementing these controllable parameters directly in radio-frequency (RF) silicon bipolar or complementary metal-oxide semiconductor (CMOS) devices, as well as with silicon-germanium (SiGe), gallium arsenide (GaAs), or other suitable high-frequency semiconductor processes. Use of these processes can make implementations of the invention inexpensive to fabricate and fast enough to be operable at VHF/UHF frequencies (hundreds of MHz) and beyond.

The invention can include generating waveforms from stored digital versions. This can simplify the hardware requirements for transmitters.

The invention can be combined with orthogonal time hopping, orthogonal frequency hopping, and hybrid frequency/time methods. By transmitting a data stream at various intervals and/or at various frequency bands, the pulse transmission can be made difficult to detect, much less decode.

Mathematical Background

By passing a rectangular pulse of chosen duration through a shaping circuit, a Gaussian waveform (or other type of waveform useful for communications) may be produced. Electronic circuitry for achieving such pulse shaping is widely described in the nuclear-detection literature. The resulting Gaussian pulse is then amplified as required and passed through further circuitry that effects a predetermined number of derivatives; the output pulse is a waveform closely approximating the desired-order derivative of an ideal Gaussian function. The pulse of desired derivative order is then linearly amplified and matched to the antenna of choice for transmission. Alternatively, lattice-filter structures can directly achieve the desired derivative order, starting with a simple bipolar input pulse.

Although the Gaussian-derivative pulse family is the preferred embodiment for practicing the invention, such practice is not limited to Gaussian pulses. In general, any family of pulses which derives from a single or multiple pulses that have a limited extent in both time and frequency are suitable for shaping and modulating as carriers of information as described herein. The derivative-derived family necessarily obeys a Rodriques' Formula; other band-limited and time-limited orthogonal functions do not, yet can serve as a family of pulses suitable to the purposes of the invention. The convenience of the Gaussian pulse stems from its unique property that both function and its Fourier transform have the same functional form, namely $\exp(-x^2/a)$ where a is a constant and x is either time or frequency. Some functions that are similarly bounded in time and frequency are the "super-gaussian" functions described by $\exp(-x^{2n}/a)$ where n is an integer>1 that represents the order of the function.

In addition, it is not required that the fundamental member(s) of the pulse family possess a convenient functional form. A time-limited square pulse can be shaped to restrict its frequency content by "rounding" the "corners," giving a smooth "square" pulse. Such a pulse meets the requiremens of limited support in both time and frequency. Derivatives of such a pulse, while not necessarily orthogonal, can carry information and be demodulated as described herein.

Another class of functions that can serve as the orthogonal family for the practice of the invention is the so-called discrete functions. Members include the Chebyshev and Krawtchouk polynomials, which are defined on a finite lattice (sample points) rather than a continuous segment. These families are suitable candidates for practicing the invention using pulses reconstituted from stored samples as previously suggested.

In general mathematical terms, any "lump" sufficiently concentrated in both time and frequency can possess either a derivative family or a family stored as discrete samples meeting the practical orthogonality and practical spectral requirements on which the practice of the invention is based. The choice of the particular shape of the root or basic member of the family is purely a practical matter, having to do with the particular means of electrically generating the pulses and coupling them to a properly designed antenna. Issues of signal propagation and reception can also play a design role in specific and individual situations.

FIG. 1 shows Gaussian-derivative wavelets in frequency space. The derivative orders from 1 to 13 are shown as a function of frequency. As the derivative order is increased, the mode of the function (center frequency) moves from near zero (or dc frequency) to higher values as shown in FIG. 1. The first-derivative pulse, shown as the dashed curve, used in communication systems according to the prior art, has a slope of $\tau\sqrt{\pi}$ at zero frequency, indicating considerable spectral power at low frequencies; the higher derivatives all have zero slope at zero frequency, indicating very little energy at low frequencies. If the initial square pulse is 1 ns wide, the abscissa is in GHz. The ordinate is in normalized power units.

The spectra of certain of these higher-order derivative waveforms have negligible content at lower frequencies and therefore possess the highly desirable property of avoiding radio frequency interference to lower-frequency services (e.g., television, radio-astronomy, cellular telephones, and general communications) in the VHF and UHF regions of the radio frequency spectrum. This constitutes a major advantage of the invention.

Since the derivative order and the shaping properties of the antenna, together with the width of the initial pulse, uniquely determine the spectral properties of the transmitted energy, a receiver employing these parameters can be designed to optimally locate and extract the transmitted energy and convert it into a sharply defined received pulse. The concept of processing gain, normally used in spread-spectrum applications, applies here also in that the bandwidth of the transmitted pulse can be very large, extending over many potential interferers, each of which overlaps the transmitted energy only marginally. The bandwidth of the transmitted pulse is typically made much larger than most interferers, even those usually thought of as broadband, such as standard direct-sequence spread-spectrum (DSSS) transmissions. Thus, even though there is very little energy per Hertz in the transmitted pulse, this energy per Hertz multiplied by the bandwidth of the pulse, which is also the receiver bandwidth, is sufficient to identify the presence or absence of a transmitted pulse, allowing both its relative arrival time and particular shape to be determined. Standard readily commercially implementable methods of time-domain correlation are sufficient for this purpose.

Bandwidth and Position as a Function of Pulse Width

The invention allows both the bandwidth and position in frequency of an individual pulse to be determined. The ability to generate higher-order derivatives is key to steering the bandwidth of the transmitted energy as desired in frequency space. An additional benefit of using derivatives is that, by starting with a rectangular pulse of longer duration, which is much easier and cheaper to handle electronically, the location in frequency now becomes a function of the derivative order. By restricting the transmitter to the first-order case, as in existing art, bandwidth and center frequency are solely determined by pulse width.

Figure 2:
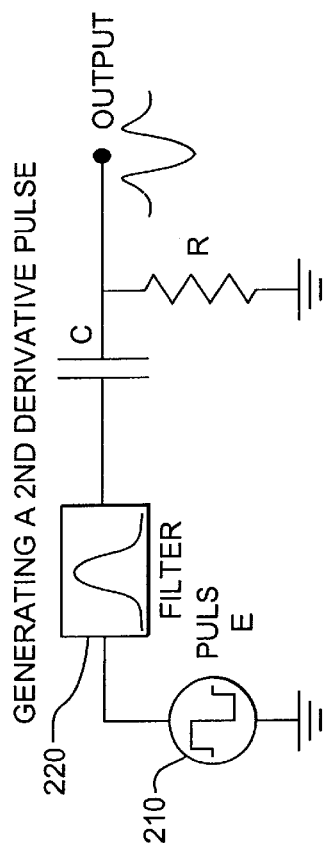
FIG. 2 illustrates a high-level schematic diagram of a circuit for generating a second-derivative Gaussian wavelet, representing an embodiment of the invention.

FIG. 2 shows a high-level conceptual schematic of one possibility for generating a second-derivative Gaussian wavelet pulse, starting with a rectangular differential pulse of duration τ at the input. This circuit shapes and transmits the pulse. In more detail, the rectangular differential pulse is generated by a signal source 210. The signal source is coupled to a filter 220. The filter 220 is coupled to the output via a capacitor C. A resistor R is coupled to the output in parallel with the capacitor C. At the output is the desired pulse shape, which may then be amplified in a broadband radio frequency amplifier and passed to the antenna.

Figure 3:
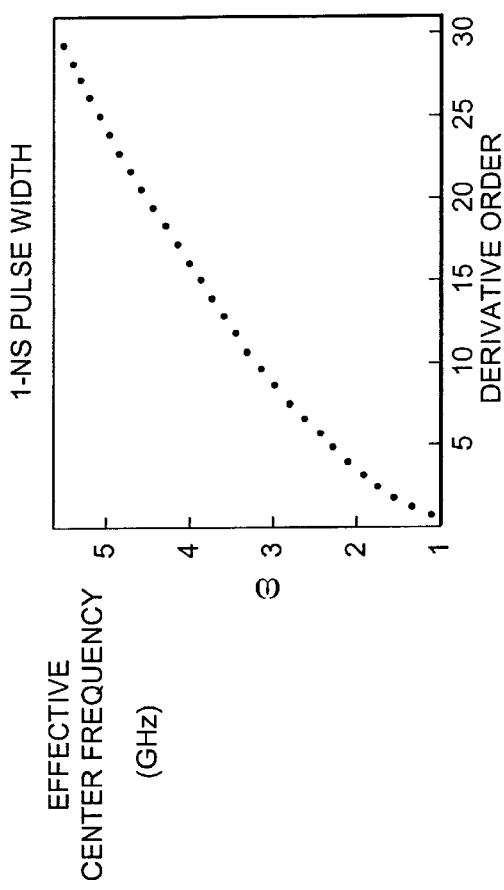
FIG. 3 illustrates center frequency as a function of derivative order, representing an embodiment of the invention.

FIG. 3 shows center frequency as a function of derivative order. If the characteristic time, τ, is 1 ns, the units of the ordinate are in $10^9$ Hz (GHz). The center frequency of a pulse with characteristic time τ and order n is $\sqrt{n}/\tau$. This variation with order is shown in FIG. 3 for τ=1.

Figure 4:
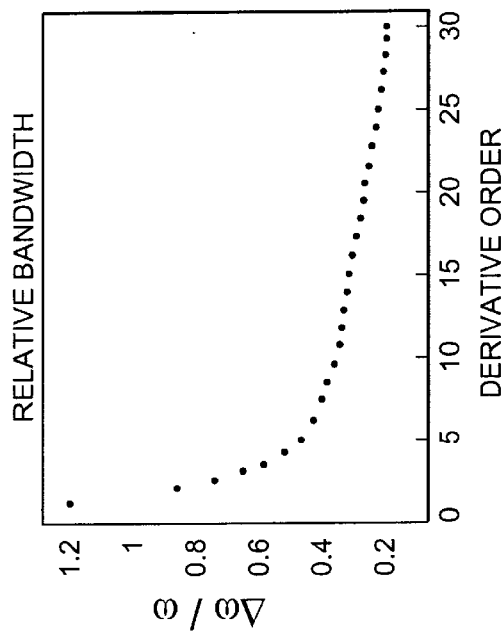
FIG. 4 illustrates relative bandwidth as a function of derivative order, representing an embodiment of the invention.

FIG. 4 shows the behavior of the relative bandwidth as a function of derivative order. At derivative orders higher than about 5, the relative bandwidth is less than approximately 50%. The relative bandwidth is only weakly dependent on τ. The 3-dB bandwidth for a given pulse width, τ, is a smooth but complicated function of τ and n; it is shown in FIG. 4. Note that the bandwidth for the n=1 pulse is considerably larger than for pulses with higher n. This feature is desirable if only the first derivative Gaussian pulse is employed, but provides no particular benefit when higher or multiple orders are used.

Figure 5:
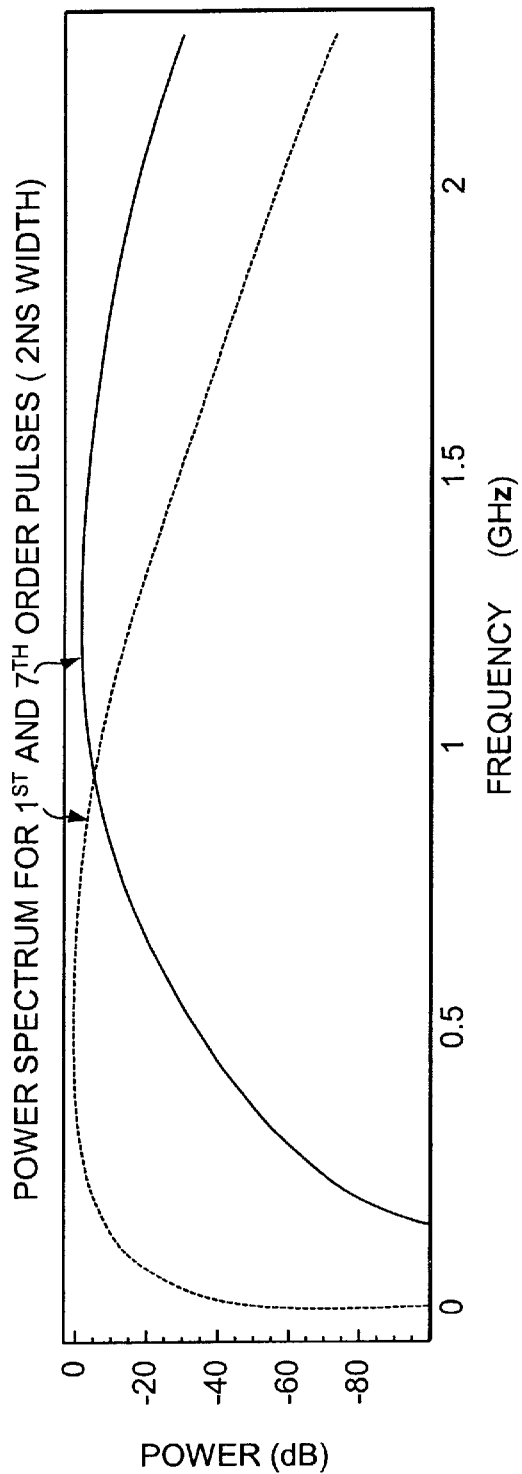
FIG. 5 illustrates the power spectrum of a 7th-order Gaussian pulse, representing an embodiment of the invention.

FIG. 5 shows the power spectrum of a 7th order Gaussian pulse with characteristic time of 2 ns. The frequency (X-axis aka abscissa) is in units of $10^9$ Hertz (GHz). The pulse is centered at 1.3229 GHz and has a bandwidth of 2.6677 GHz. For comparison, the first-order derivative used in certain existing devices is shown as the dashed curve. Note that the pulse derived according to the existing art has much more energy at frequencies below about 500 MHz and will tend to contribute significant interference to services in that region (e.g., television, aircraft and public-service radios, and so forth).

Single Pulse—1 Bit Per Symbol

Prior-art techniques in the field of time-domain communications make exclusive use of the first derivative of a Gaussian function. The relative arrival times, referred to that of the preceding pulse(s) received, contain the data (message or information) transmitted. The invention neither makes use of the first derivative pulse nor encodes information via relative arrival times, preferring to allow arrival times to be determined by the dispersive and reflective characteristics of the physical channels and specifically avoiding the first derivative pulse due to its low-frequency nature.

The presence of derivative pulses of various orders constitutes frequency-spectrum modulation and is completely independent of the signaling-pulse timing which defines prior-art pulse time modulation methods. Indeed, the prior-act systems all employ pulse-position or pulse-time modulation of one variety or another, including pulse edge-timing modulation. The time-averaged power spectra of these prior-act signals are essentially stationary for random-data modulation, although the overall spectral width is strongly (inversely) dependent on the basic generating-pulse width. The average power spectrum of the individual first-order Gaussian derivative pulses is also highly dependent on the pulses-to-pulse time deviation (pulse time or position modulation). For small deviations, the spectrum is more concentrated around the center frequency corresponding to the average pulse repetition rate, whereas at higher deviations (approaching the average pulse-to-pulse interval), the spectrum is more spread out (dispersed).

The spectra of higher-order derivative pulses are, in general, much broader and more uniform (better dispersed) than the prior-art signals. Except for the low-frequency limitations, which are often highly desirable, the higher-order pulse spectra are more continuous and less "multi-line" in nature than competing technologies; they therefore more closely resemble the spectrum of true random noise and thus provide better signal concealment (low probability of detection).

Multiple Pulses-Multiple Bits Per Symbol

Figure 6:
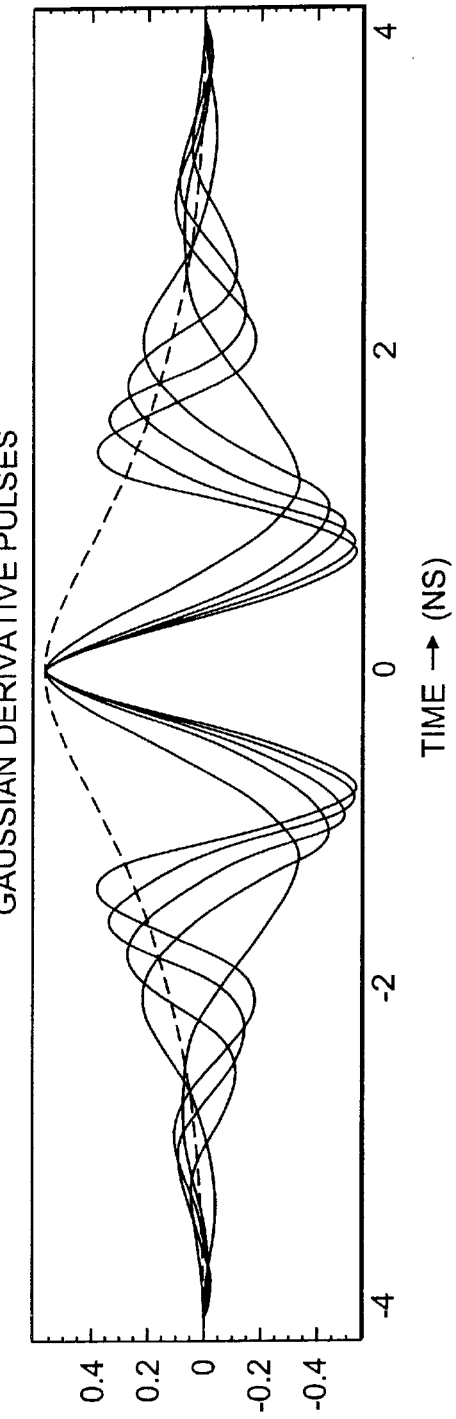
FIG. 6 illustrates a series of Gaussian derivative time-domain pulses, representing an embodiment of the invention.

Significantly, due to the different pulse shapes/occupying the different frequency bands, higher-order pulses are identifiable by shape as belonging to a particular derivative order. FIG. 6 shows Gaussian-derivative, time-domain pulses of order 4, 8, 12, 16, and 20. The underlying Gaussian function is shown as a dashed line. As n increases, the width at zero time decreases, indicating increasing frequency. The abscissa values are in units of the width of the initial square pulse.

The technique of transmitting several pulses, each with a different derivative order, at the same time, is equivalent to transmitting a vector pulse or a code-word symbol having more that one bit. This capability immediately opens up a much higher data rate than is possible with a system based on a single Gaussian-derivative pulse.

The invention circumvents both the noise-susceptibility and the increased-power problems of existing multi-state data quadrature amplitude (m-QAM) modulations by using mutually orthogonal states for each bit transmitted. In addition, each pulse has two distinct quadrature phases, effectively doubling the bits-per-symbol figure of merit. This orthogonality is an inherent property of the Hermite polynomials that underlie the pulse shape of the Gaussian-derivative functions.

Figure 7:
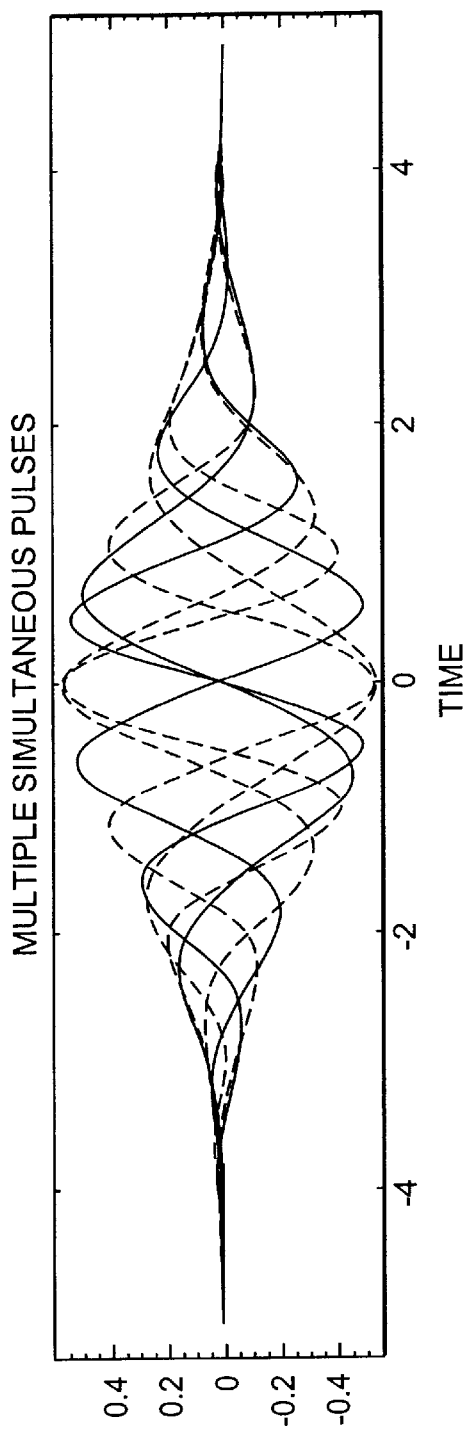
FIG. 7 illustrates a series of 7 superimposed Gaussian derivative pulses of orders 2–8 composing a set of symbol codes, representing an embodiment of the invention.

FIG. 7 shows 7 time-domain pulses for the orders 2 through 8 (the dashed curves are of even order). The seven superimposed Gaussian derivative pulses of orders 2 through 8 compose a set of symbol codes for transmitting $2^7=128$ different possible symbols in a single composite pulse, or 255 possible symbols when pulse phase is used.

Figure 8:
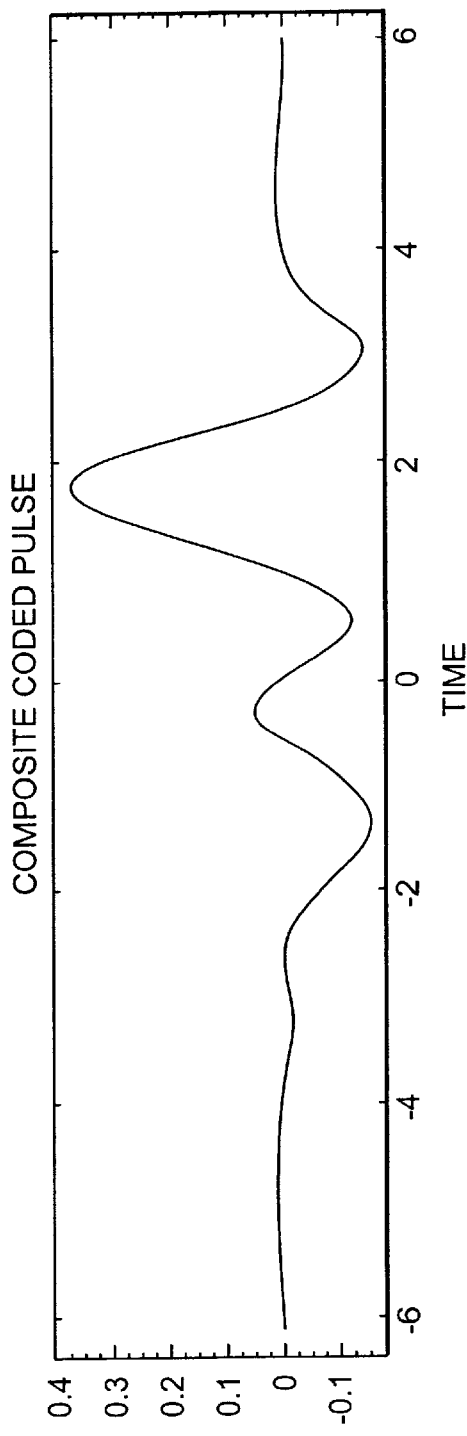
FIG. 8 illustrates a composite pulse representing the binary code 01 01 11 01, representing an embodiment of the invention.

FIG. 8 shows the combination, by simple addition, of the pulses for orders 3, 5, 6, and 8, thereby encoding the binary symbol 0101101 in the sum for transmission. The abscissa is in units of the characteristic time. It can be appreciated that the combined pulse looks nothing like any of the original pulses.

Figure 9:
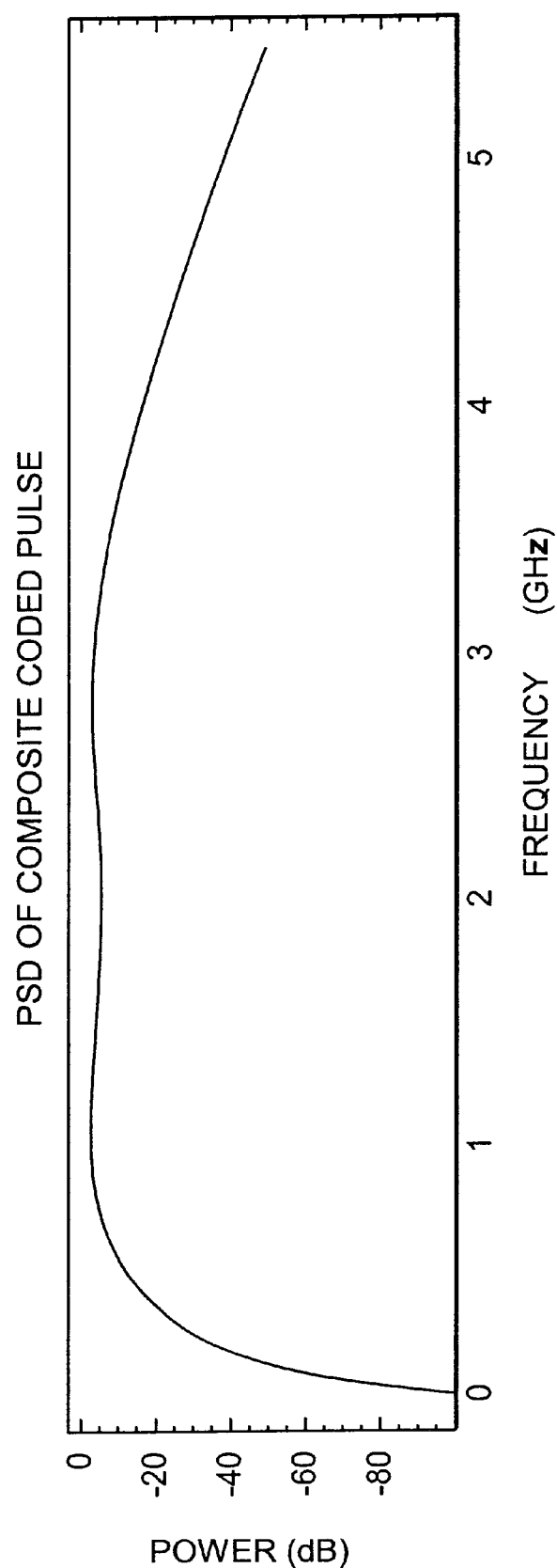
FIG. 9 illustrates the power spectral density of the composite pulse depicted in FIG. 8.

FIG. 9 shows the power spectral density of the composite pulse representing the binary code 0101101. The abscissa is in GHz for a characteristic time of 1 ns. The power-spectral density extends (at the −20-dB level) or 1%-power point approximately over 3.85 GHz for a characteristic time τ of 1 ns. The information in this frequency band may be extracted at the receiver by simply effecting a correlation in parallel of the received pulse with the pulses comprising the set of symbol codes. Since set is orthogonal when all members have the same characteristic time τ, the result of such a correlation will show maximally strong peaks at just the code values transmitted. A specific implementation of this approach is detailed in later pages.

Suppose that the above pulse is received and processed with an array of correlators. The output of the array, in the absence of interferers and other noise, reproduces the binary code exactly at zero correlation lag. To obtain knowledge of the time of the zero lag, a precursor pulse based on a single derivative Gaussian wavelet can be transmitted at a precisely known time several time constants prior to the transmission of the composite pulse. The precursor pulse is then used by the receiver to synchronize on each message pulse and is an integral part of the coding scheme. For example, a receiver tuned to a slightly different precursor would attempt to decode the composite pulse with an incorrect lag value, obtaining nonsense for the decoded symbol. Correct correlation also requires a suitable integrating function that is implemented in electronic circuitry much as the derivative pulses were derived: decoding then becomes a simple matter of correlating the incoming pulse in parallel with multiple candidate pulses.

Thus, a series of non-interfering (orthogonal) pulses can be transmitted simultaneously and subsequently received and decoded simultaneously, allowing multiple bits per transmitted symbol to be communicated. A parallel correlator will respond appropriately in the presence of both broad- and narrow-band interferers.

EXAMPLES

Specific embodiments of the invention will now be further described by the following, nonlimiting examples which will serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention.

Transmitter Architecture

Figure 10:
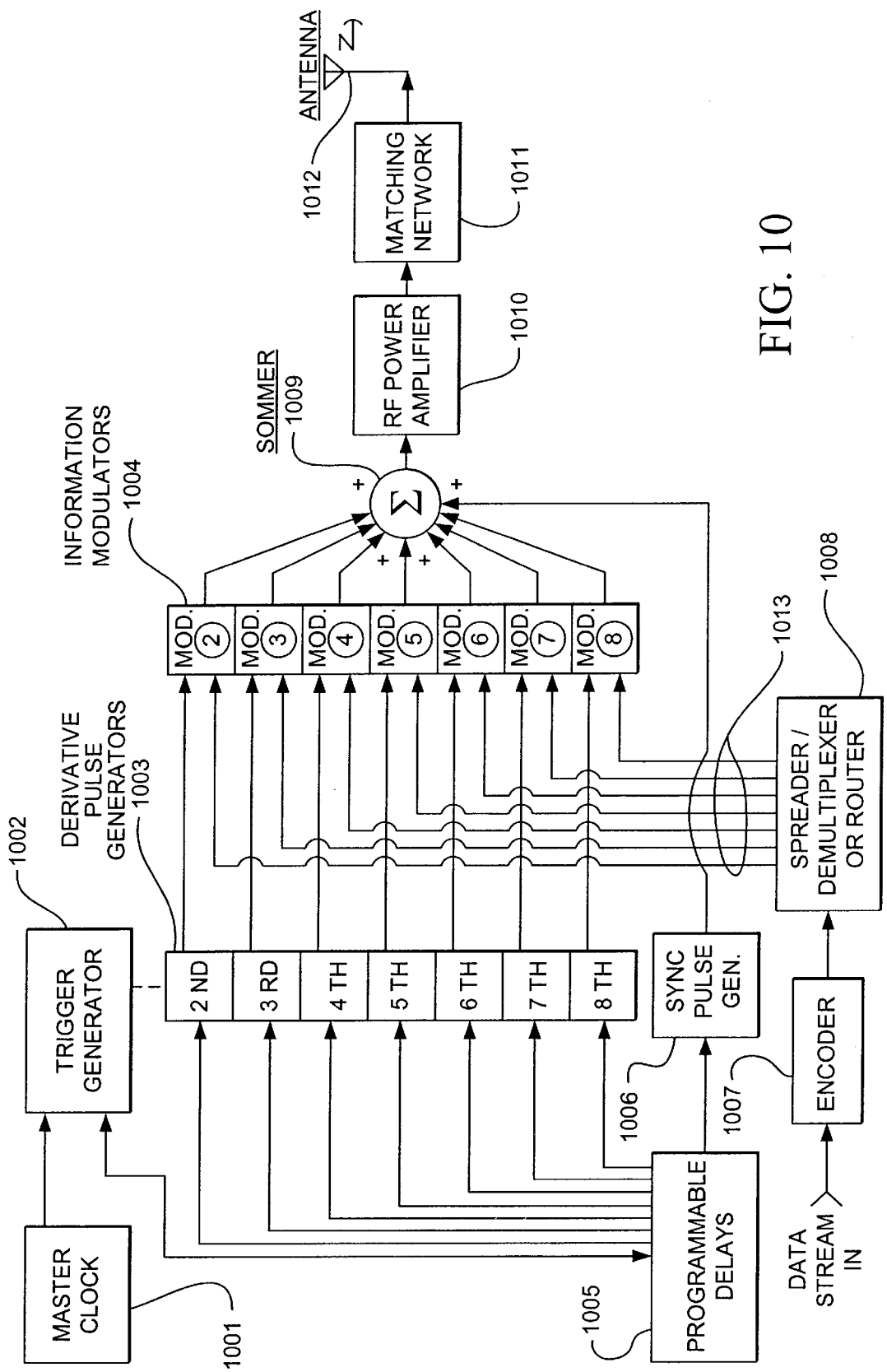
FIG. 10 illustrates a high-level schematic diagram of a circuit for transmitting, representing an embodiment of the invention.

FIG. 10 shows a block diagram of a transmitter in the preferred embodiment, where derivative-pulse generators of orders 2 through 8 are used to generate 7 separate parallel-path signals, each corresponding to a specific derivative-order signal. (The number seven is chosen by way of example and is in no way limiting.) Looking at the overall signal flow, a digital data stream at lower left enters encoder 1007 to be processed and augmented by error detection/correction bits, framing bits, and such. The encoded output from 1007 feeds spreader/demultiplexer/router block 1008, which via a predetermined algorithm and/or logic configuration processes and sorts the encoded data bits or units into 7 separate data streams 1013, which in turn feed each of the 7 parallel data-modulator blocks 1004.

Meanwhile, a master clock oscillator 1001 generates stable timing signals to control trigger generator 1002, which determines the pulse transmission timing interval. In this embodiment of the invention, these pulses have uniform time spacing and thus constitute a stable, single-frequency, unmodulated trigger or clock source to drive the 7 parallel derivative pulse generators 1003 through the intervening programmable delay generator 1005. This block permits the relative phases of the 7 derivative pulses to be individually adjusted in a static sense but in this implementation is not used for modulation purposes. An additional output from 1005 feeds synchronization pulse generator 1006, which at a preselected time produces a specific-format sync pulse to assist the associated receiver in data recovery at the other end of the transmission link.

The 7 aforementioned derivative-pulse generators 1003, designated by the derivative orders (2 through 8), each take the 7 independent trigger pulses and produce a shaped derivative (Gaussian or otherwise) pulse of the shapes shown in FIG. 6. These shaped pulses are sent to the aforementioned information modulator blocks 1004, designated by the number of the respective derivative-order pulse being processed. The group of 7 encoded and routed modulation signals of group 1013 are also fed to their respective modulators in block 1004. Each of the signals of 1013 may be analog or digital, binary, ternary or multistate, as appropriate for the specific application.

Each modulator block in the group 1004 may implement analog modulation (i.e., amplitude, frequency, or phase—amplitude modulation (AM), frequency modulation (FM) or phase modulation (PM) or digital modulation forms such as binary phase-shift keying (BPSK), phase-shift keying, FSK, minimum-shift keying (MSK) for standard binary signals. In addition, more complex multistate modulation formats such as quadrature phase-shift keying (QPSK), offset quadrature phase-shift keying (OQPSK), quadrature amplitude modulation, multi-state data quadrature amplitude modulation, multi-state data phase-shift keying (MPSK), multi-state data frequency-shift keying (MFSK) and others are also quite useful in some applications. In addition, amplitude-shift-keying (ASK), on-off keying (OOK) and others may be applied via straightforward techniques familiar to those skilled in the art. Further, ternary (3-state) and other multi-level modulations can be extremely useful in achieving the derivative-pulse modulation. Since a key aspect to the invention is the mutual orthogonality (statistical independence) of the various derivative-pulse signals, the use of on-off keying, or in combination with standard binary phase-shift keying modulation (0° or 180° shift) is especially beneficial in optimizing the inter-signal orthogonality, since the normal derivative signal (noninverted state), inverted derivative signal (inverted state), or no signal at all ("off" state) are all orthogonal, even with data modulation. This combination of modulation states is particularly advantageous for use of ternary data states (+1, 0, =1). This modulation may be standard data, PN sequences or spread-data sequences as well.

The outputs of the parallel data modulators are combined with the previously mentioned sync pulse (from 1006) in summer/combiner block 1009, which is typically a straightforward linear added device but which may in some cases be implemented via digital switching means (dependent on the relative timing of the pulse set or other system consideration). The output from summer 1009 is then amplified up to an appropriate power level by amplifier 1010, which in turn feeds the transmitting antenna 1012 through matching network 1011, according to typical practice.

Figure 11:
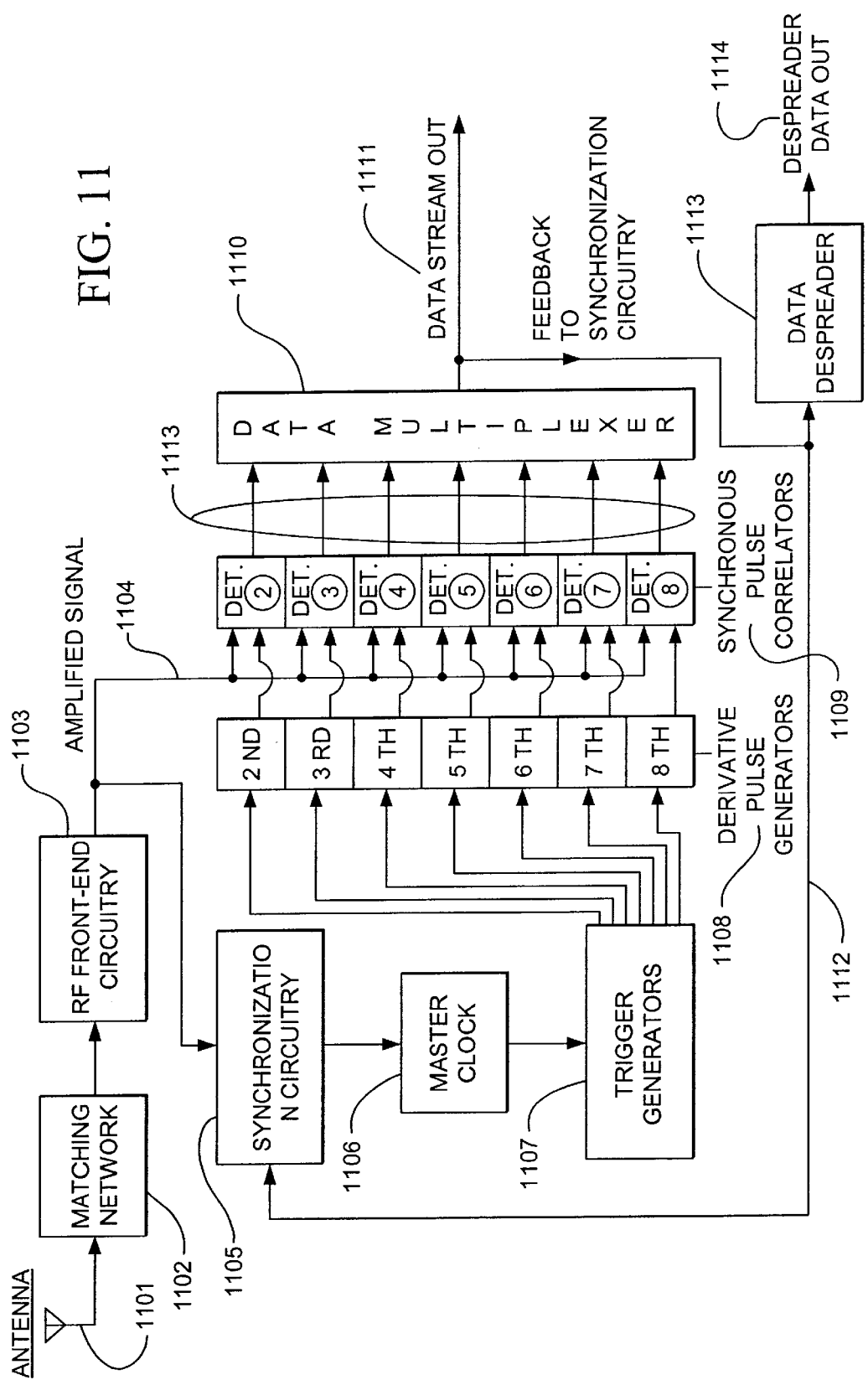
FIG. 11 illustrates a high-level schematic diagram of a circuit for receiving, representing an embodiment of the invention.

FIG. 11 shows a corresponding receiver according to the present invention. The radio frequency signal is received by antenna 1101, coupled though matching network 1102 and processed by conventional high-gain radio-frequency circuitry in receiver front-end block 1103. This device provides tuning adjustments, filtering automatic gain- and frequency-control functions, and overall control to produce a stable-amplitude, relatively low-noise wideband signal at 1104 which is routed to the 7 parallel synchronous pulse-correlation detectors in group 1109. Meanwhile, the output of 1103, line 1104, feeds a synchronization subsystem block 1105 which recovers the predetermined sync pulse, locks to the timing signal embedded therein, and corrects the frequency of the master receiver-system clock 1106. The master clock in turn controls the timing of the trigger generators (one for each derivative-pulse generator) at 1107. Each trigger pulse initiates the generation of the appropriate derivative-pulse generator block in group 1108, which is designed to produce the same precise pulse shape as its corresponding unit 1003 in the transmitter system of FIG. 10. Again in FIG. 11, the outputs of all 7 pulse generators at 1108 are fed into the reference inputs of the corresponding synchronous pulse correlators in group 1109. These detectors correlate, integrate, and filter the respective received pulses with their locally generated versions and implement decision logic functions to produce the respective data outputs at 1113. These 7 output-decision signals, representing the 7 detected information streams (assumed digital for the moment), are combined/decoded/assembled in data multiplexer block 1110 to produce a final series bitstream output at 1111. Meanwhile, the assembled data stream at 1111 is fed back through line 1112 to the synchronizer block at 1105 to assist in system sync lock-up (acquisition) and tracking. For spread-spectrum signals, the final output stream 1111 may be sent to a common despreader 1113 to extract the original data from the composite spread-spectrum clipstream. Alternatively, each corrector/detector module in group 1109 can be equipped with a conventional amplitude-shift keying, frequency-shift keying, phase-shift keying, quadrature phase-shift keying, offset quadrature phase-shift keying, minimum-shift keying, multi-state data phase-shift keying, multi-state data frequency-shift keying, multi-state data quadrature amplitude modulation, or other appropriate type of data demodulator to extract modulation information from the correlated derivative-pulse outputs; in this case, the demodulated (unspread) data would appear on the parallel paths designated 1113. In the case of spread-spectrum modulation on each of the derivative signals, a spread-spectrum decoder would be inserted within each detector block in 1109 between the data-demodulation and the output points feeding lines 1113. An optional despreader 1113 is coupled to the stream 1111 and despread data out 1114.

Figure 12:
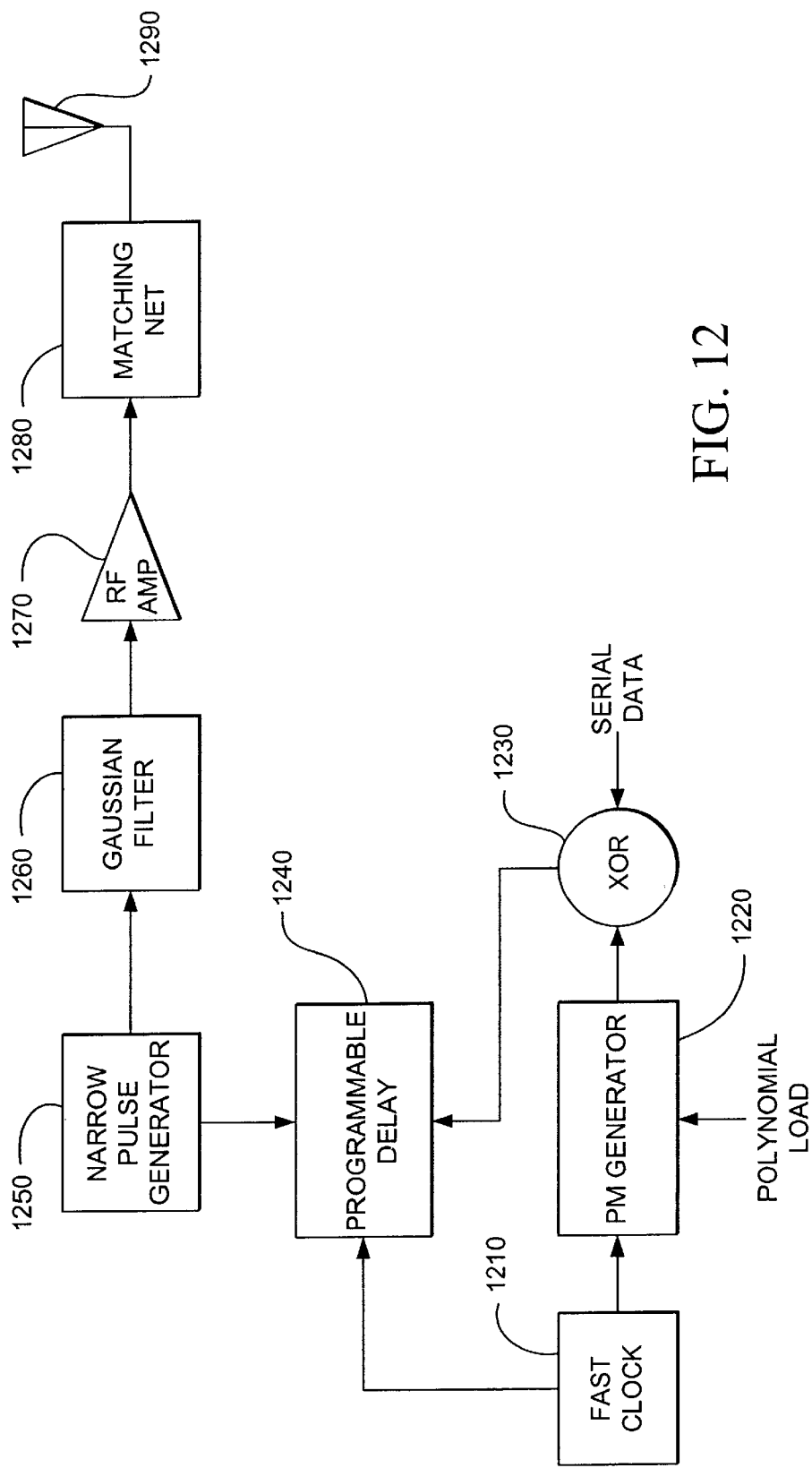
FIG. 12 illustrates a high-level schematic of a circuit for transmitting, representing an embodiment of the invention.

FIG. 12 shows a first transmitter block diagram where the higher-order derivative-pulse shaping features of the present invention are applied to existing-art devices to improve their bandwidth efficiency or reduce interference to other users and bands. The output of the fast-pulse block is presented to a specialized Nth-order Gaussian (or other) filter circuit (either passive or active) of an appropriate shape to produce the desired higher-order (i.e., 2nd or above) Gaussian-derivative or other selected pulse shape.

FIG. 12 shows a high-speed clock 1210 used to provide triggering and synchronization that is coupled through a digital frequency divider to both a pseudorandom polynomial generator block 1220 and a programmable delay circuit 1240 to permit adjustment of the actual fast-pulse timing. The delay circuit 1240 is coupled to a fast-pulse generator block 1250. The frequency of the high-speed clock 1210 is on the order of the inverse of the generator-stage output pulse duration. Serial digital data to be transmitted is modulo-2 multiplied by an exclusive-OR gate 1230 with the pseudorandom polynomial data stream emerging from the PN-generator block 1220. Internally, this includes a standard, serial shift-register with programmable feedback interconnects placed at appropriate points to produce one of several desired digital polynomials; the detailed design of this type of generator is well known in the spread-spectrum communications and coding art and will not be discussed further. Given that the block 1220 produces a desirable pseudorandom code sequence (e.g., a Gold, maximal-length, or Kasami code), the output bit-stream (often termed chipping sequence to distinguish it from the conventional data bits), is XORed with the true data bits and used to control the programmable delay circuit 1240 in a similarly pseudorandom manner. This in turn forces the timing of the emerging narrow pulses from the pulse generator block 1250 to be varied according to the statistics of the PN code (altered by the data, obviously). Note that the actual width of the narrow (fast) pulses the PW control line can also be modulated by another external signal, such as that obtained from a second PN generator circuit; this could employ the same or different codes as the original PN unit, and may also be modulated by the actual data stream as required. The pulse generator block 1250 is coupled to a Gaussian filter 1260 which is coupled to a radio-frequency amplifier 1270 which is in-turn coupled to a matching network 1280 and an antenna 1290.

Figure 13:
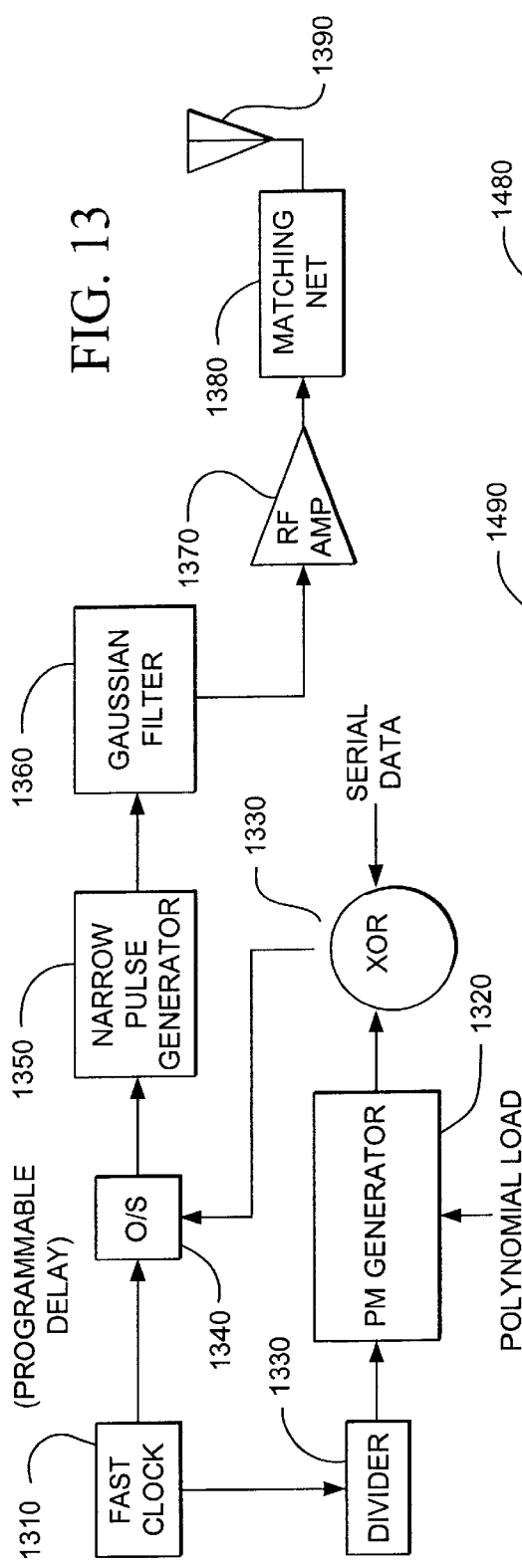
FIG. 13 illustrates a high-level schematic of another circuit for transmitting, representing an embodiment of the invention.

FIG. 13 shows a second transmitter block diagram of the same variety. The only significant difference from the previous example is that a master clock 1310 drives a programmable-delay monostable multivibrator circuit 1320 (commonly termed a one-shot), which generates a pseudorandom variable pulse width at its output. This pseudorandom variable pulse width in turn time-modulates the trigger signal for the separate fast-pulse generator 1350, which also may have its output pulse width controlled as before. The symbol "O/S" in FIG. 13 indicates the programmable delay "one-shot." The master clock 1310 is also coupled to a divider 1330 which in-turn is coupled to the generator 1320 and the exclusive-OR gate 1330. As in the previous example, the pulse generator block 1350 is coupled to the Gaussian filter 1360 which is coupled to the radio frequency amp 1370 which is in-turn coupled to the matching net 1380 and the antenna 1390. The principal reason for this alternate version is to facilitate partitioning of the standard-speed and very high-speed portions of the transmitter circuitry for optimum layout and fabrication as a custom integrated-circuit chip (ASIC).

Receiver Architecture

Figure 14:
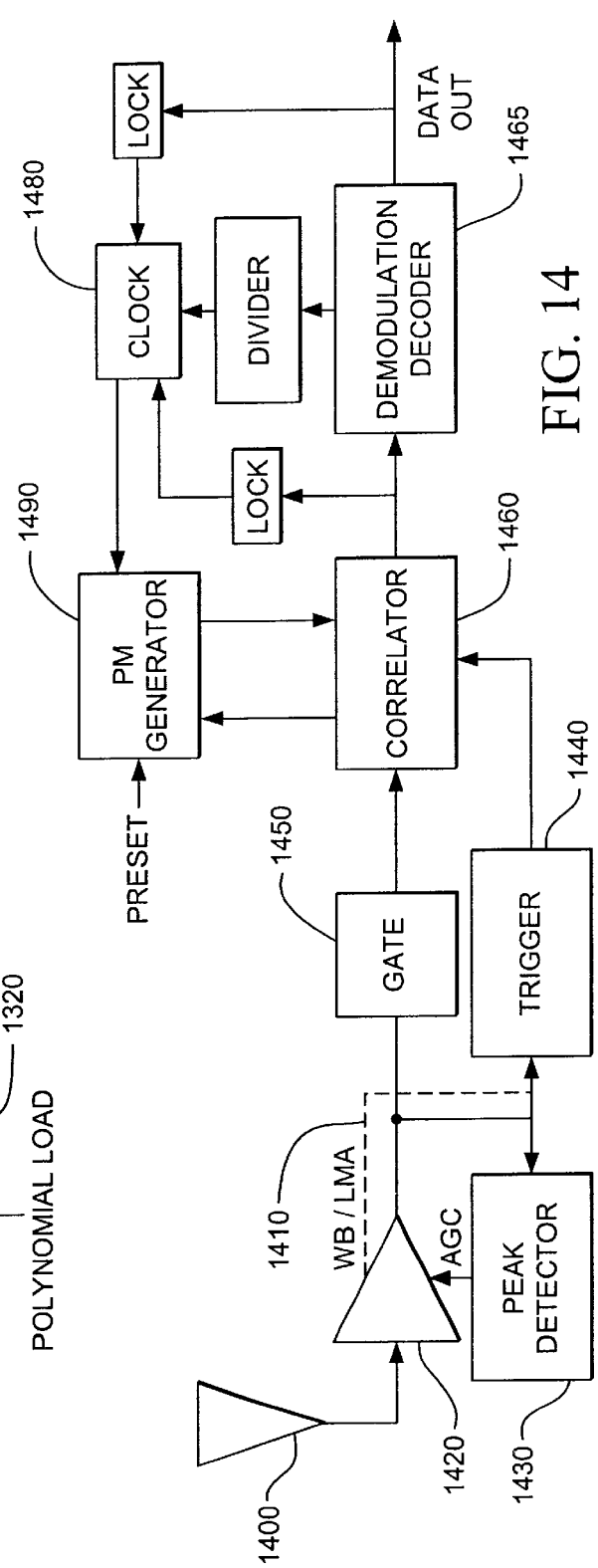
FIG. 14 illustrates a high-level schematic of another circuit for receiving, representing an embodiment of the invention.

FIG. 14 shows a wideband or ultra-wideband (UWB) receiver for implementing an embodiment of the invention corresponding to the previous transmitters of FIGS. 12 and 13. A broadband radio frequency signal from a receiving antenna 1400 is bandpass-filtered by a wideband filter/low-noise amp 1410 to admit the desired frequency range and simultaneously reject out-of-band signals and interference. Appropriate Gaussian pulse-shaping and/or equalization may also be performed by the wideband filter/low-noise amp 1410. The following low-noise, front-end amplifier (LNA) then boosts the signal amplitude to a useful level. An integral automatic gain-control (AGC) loop 1420 that includes a peak detector 1430 regulates the LNA's output to accommodate both high and low input-signal levels while maintaining good amplifier linearity. The LNA output also drives a synchronization-trigger detector circuit 1440 which is used to start the synchronization process in the downstream portion of the receiver system. Typically, a sync burst or preamble (or perhaps a specially configured data sequence) will be transmitted at or near the beginning of each data block to facilitate rapid synchronization and acquisition of the data stream in the receiver, although this is not absolutely mandatory. If a valid trigger signal is detected, the pulse is gated by a gate 1450 through to a correlator 1460. The correlator 1460 circuit performs the template-matching of the incoming Gaussian pulse stream with the selected-order pulse shape. The output from the correlator 1460 then drives the following data demodulator/decoder 1465 to secure the desired output data stream. Additional signal tracking and synchronization are handled by a combination of a feedforward phase-lock synchronizer driven by the correlator output and a feedback locking path derived from the final received data bitstream. The combined outputs drive a variable-frequency clock 1480, which in turn, regulates the readout rate of a PN generator 1490, thus acquiring (and maintaining) lock with the local PN sequence in time and phase to the incoming PN chipstream arriving from the transmitter. Thus, FIG. 14 shows a receiver block diagram with synchronization and demodulation details.

Note that adaption of standard readily commercially available direct-sequence spread spectrum receiver technology is suitable for some embodiments of the invention. Specifically, receiver methods presently known to be used in spread-spectrum receivers are sufficient. An alternative approach is to employ an analog correlator based on the spectral properties of the precursor synchronization pulse. To avoid issues of time synchronization, this correlator 1460 can take the form of a matched filter having maximal response, relative to its input power, when a pulse of the desired shape is present.

While not being limited to any particular performance indicator or diagnostic identifier, preferred embodiments of the invention can be identified one at a time by testing for the ability to equalize the derivative shapes to various antenna and transmission-channel characteristics. Another way to seek preferred embodiments is to test the ability of the broad spectrum being transmitted to be notch filtered. Another way to seek preferred embodiments is to test for minimal dispersive effects.

Practical Applications of the Invention

A practical application of the invention that has value within the technological arts is clandestine communications due to its very low transmitted radio frequency power. Further, the invention is useful in conjunction with reliable communications in the presence of severe multipath interference, or in conjunction with high data rate spread spectrum communications, or the like. There are virtually innumerable uses for the invention, all of which need not be detailed here.

Advantages of the Invention

A pulse transmission transceiver architecture for low power communications, representing an embodiment of the invention, can be cost effective and advantageous for at least the following reasons. The invention makes more practical (i.e., commercially feasible) the class of time-domain, spread spectrum communications. The invention significantly reduces lower-frequency emissions from time-domain spread spectrum communication modes, thereby reducing potentially harmful interference to existing radio frequency services and users. The invention can make greater receiver selectivity possible. The invention also makes transmission of multiple bits per time-domain symbol possible.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, although the time-domain transceiver architecture described herein can be a separate module, it will be manifest that the time-domain transceiver architecture may be integrated into the hardware/software with which it is associated. Further, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended subclaims.

What is claimed is:

1. A pulse transmission receiver, comprising:
   a front-end amplification/processing circuit;
   a synchronization circuit coupled to said front-end amplification/processing circuit;
   a clock coupled to said synchronization circuit;
   a trigger signal generator coupled to said clock; and
   at least one higher-order time derivative pulse generator coupled to said trigger signal generator.

2. The pulse transmission receiver of claim 1, further comprising at least one received pulse detection circuit coupled to said at least on higher-order derivative pulse generator.

3. The pulse transmission receiver of claim 2, wherein said at least one received pulse detection circuit includes a synchronous pulse correlator.

4. The pulse transmission receiver of claim 3, wherein said at least one higher-order time derivative pulse generator includes a data demodulator.

5. The pulse transmission receiver of claim 4, wherein said data demodulator provides at least one function selected from the group consisting of amplitude demodulation, frequency demodulation, phase demodulation, digital binary demodulation, phase-shift keying, binary phase-shift keying, quadrature phase-shift keying, offset quadrature phase-shift keying, frequency-shift keying, minimum-shift keying, amplitude shift keying, on-off keying, multi-state data frequency-shift keying, multi-state data phase-shift keying, multistate data quadrature amplitude demodulation, ternary digital demodulation, and n-state digital demodulation.

6. The pulse transmission receiver of claim 1, further comprising a programmable delay circuit connected between said trigger signal generator and said at least one higher-order time derivative pulse generator.

7. The pulse transmission receiver of claim 1, including a multiplexer coupled to said at least one higher-order time derivative pulse generator.

8. The pulse transmission receiver of claim 7, further comprising a data despreader coupled to said multiplexer.

9. The pulse transmission receiver of claim 8, further comprising a connection between said data despreader and said synchronization circuit adapted to provide automatic frequency/synchronization control.

10. The pulse transmission receiver of claim 1, further comprising a matching network connected to said front-end amplification/processing circuit;.

11. The pulse transmission receiver of claim 10, further comprising an antenna coupled to said matching network.

12. The pulse transmission receiver of claim 1, wherein said at least one higher-order time derivative pulse generator includes a filter.

13. The pulse transmission receiver of claim 12 where said filter includes a higher-order time derivative Gaussian filter.

14. A one-chip integrated circuit including the pulse transmission receiver of claim 1.

15. The pulse transmission receiver of claim 14, wherein said one-chip integrated circuit is implemented in a semiconductor selected tom the group consisting of silicon bipolar, complementary metal-oxide semiconductor, silicon-germanium and gallium arsenide.

16. The pulse transmission receiver of claim 12, wherein said filter includes a higher order time derivative super-Gaussian filter described by $\exp(-x^{2n}/a)$ where x is time, n is an integer greater than 1 that represents an order and a is a constant.

17. The pulse transmission receiver of claim 12, wherein said higher order time derivative filter includes a higher order time derivative rounded time-limited square pulse liter.

18. The pulse transmission receiver of claim 12, wherein said higher order time derivative filter includes a higher order time derivative discrete filter.

19. The pulse transmission receiver of claim 18, wherein said higher order time derivative discrete filter is selected from the group consisting of Chebyshev polynomials and Krawtchouk polynomials.

* * * * *